(12) United States Patent
Sulmone

(10) Patent No.: US 8,689,826 B2
(45) Date of Patent: Apr. 8, 2014

(54) VALVE CONTROL HAND WHEEL WITH POSITION INDICATOR AND MAGNETIC COUPLE FEATURE

(75) Inventor: Michael Sulmone, Collegeville, PA (US)

(73) Assignee: Trident Emergency Products, LLC, Collegeville, PA (US)

( * ) Notice: Subject to any disclaimer, the term of this patent is extended or adjusted under 35 U.S.C. 154(b) by 0 days.

(21) Appl. No.: 13/480,684

(22) Filed: May 25, 2012

(65) Prior Publication Data
US 2013/0133763 A1 May 30, 2013

Related U.S. Application Data

(60) Provisional application No. 61/519,566, filed on May 25, 2011.

(51) Int. Cl.
*F16K 37/00* (2006.01)
(52) U.S. Cl.
USPC .......................... 137/556.3; 116/277
(58) Field of Classification Search
USPC ................ 137/553, 554, 556, 556.3, 556.6; 116/277, 284, 298, 305, 327, 328
See application file for complete search history.

(56) References Cited

U.S. PATENT DOCUMENTS

| 4,411,288 A | * | 10/1983 | Gain, Jr. ....................... 137/363 |
| 6,079,442 A | * | 6/2000 | Raymond et al. ............. 137/554 |
| 6,343,615 B1 | * | 2/2002 | Miller et al. .................. 137/202 |

* cited by examiner

*Primary Examiner* — Elizabeth Houston
*Assistant Examiner* — Angelisa Hicks
(74) *Attorney, Agent, or Firm* — Dilworth Paxson LLP

(57) ABSTRACT

A hermetically-sealed valve position indicator is provided with a valve control handwheel. Indicator includes a magnetic-coupling with a stationary mount for the valve control handwheel. During operation of valve control handwheel, its handwheel and shaft rotate along with a housing, housing cover, housing window, primary shaft, and drive gear about the actuator's central axis of rotation—clockwise or counter-clockwise. Drive gear engages with drive train to rotate a needle across a dial face to indicate the position of a valve. Drive train includes two gears rotatably attached to a secondary shaft and an indicator gear attached to a back end of sleeve slid over a front portion of primary shaft. The needle is disposed on the front end of sleeve with the dial face positioned between the indicator gear and the needle.

20 Claims, 5 Drawing Sheets

VALVE CONTROL HAND WHEEL WITH POSITION INDICATOR AND MAGNETIC COUPLE FEATURE

CROSS-REFERENCE TO RELATED APPLICATION

This application claims priority to and the benefit of U.S. Provisional Patent Application Ser. No. 61/519,566, filed on May 25, 2011, entitled "Valve Control Hand Wheel With Position Indicator and Magnetic Couple Feature" the entirety of which is incorporated herein by reference.

FIELD OF THE INVENTION

The present invention relates to a valve control handwheel with a valve position indicator and magnetic coupling.

BACKGROUND OF THE INVENTION

Vehicles such as fire engines, pumpers, trucks, and other vehicles that pump water or other fluids use different controls to actuate valves in piping systems. Additionally, stationary and mobile pumping systems for liquids, gases, vapors, slurries, etc., also use valve control systems. Valve control devices include linear actuation control rods, angular displacement handles, electric actuators, pneumatic actuators, hydraulic actuators, and valve control handwheels. For example, a valve control handwheel may be attached by linkage, e.g., a worm gear drive or other linkage, to a valve. The valve control handwheel is used to start, stop, reduce, increase, and regulate the flow of liquids, gases, vapors, slurries, etc. through the valve. It can also regulate piping system pressure. Rotation of the valve control handwheel turns the linkage and rotates a ball, plug, or butterfly of the valve. The valve control handwheel controls the flow of liquid through the valve, whether partially or entirely opened or closed.

Several problems exist with valve control handwheels. Many valve control handwheels lack a position indicator for the valve that they control. In the absence of a valve indicator, the operator must estimate the position of the valve. Limited types of indicators are available for valve control handwheels. For example, valve control handwheels may have analog dial indicators centrally located on the handwheel. Analog indicators rely on gravity to keep a dial face stationary relative to the rotating handwheel as an indicator needle moves adjacent the dial face. This design works only if the analog indicator is mounted vertically on a surface so that its dial face is also vertical. It will not work properly if mounted on a surface that is horizontal or insufficiently inclined because gravity will be less effective or ineffective in maintaining the dial face in a relatively stationary position. Consequently, this will nullify or minimize the accuracy of the analog dial indicator. To overcome this limitation, some analog valve position indicators include a mechanical protrusion that contacts a stationary panel and secures the dial face in a stationary position relative to rotation of the valve control handwheel and as its indicator needle moves relative to the stationary dial face. While the mechanical mechanism prevents rotation of the dial face, its allows for moisture and other potentially corrosive debris to enter the valve position indicator and foul its works which, over time, renders the indicator inaccurate and then completely unusable.

SUMMARY OF THE INVENTION

The invention provides a visible and reliable valve position indicator that overcomes the limitations of other valve control systems. The valve position indicator is a substantially self-contained device with the exception of an external magnet. The valve position indicator may be secured to any type and form of valve control handwheel that uses rotational force to open and close a valve. The valve position indicator includes a housing with a window enclosing a sub-assembly in the indicator's interior which is defined by a housing, a window, and a cover. The sub-assembly comprises a support member, a rolling member (e.g., a bearing or the like), a magnet, a dial face, and a gear train driven by a drive gear attached to a fixed shaft. The gear train moves an indicator needle adjacent a dial face secured to support member. The magnet of the subassembly magnetically couples with the external magnet that is attached on a surface adjacent to and in near proximity with the housing of the valve position indicator.

The polarities of the two magnets are aligned in such a way that the two magnets are attracted to one another, but not in direct contact. The magnetization (or strength) of the two magnets maintains the sub-assembly in a relatively stationary position within the housing which is secured to the valve control handwheel. The sub-assembly is held in a stationary position during clockwise and counterclockwise rotation of the valve control handwheel. This rotation moves the valve from an open position through intermediary positions to a closed position, and vice versa.

The rotational axis of the fixed shaft is aligned with the valve control handwheel's central axis of rotation. The rolling member, e.g., a bearing or the like, permits rotation of the fixed shaft and drive gear relative to the sub-assembly held stationary by the magnets. The drive gear engages with and turns a corresponding rear gear mounted on a secondary shaft positioned parallel to the valve control handwheel's axis of rotation. A front gear, which is also mounted on the secondary shaft, rotates along with the rear gear driven by the fixed gear. For clarity, one complete rotation of the rear gear equals one complete rotation of the front gear. The front gear is engaged with and rotates an indicator gear attached at a back end of a cylindrical sleeve positioned over the front portion of the fixed shaft. Attached at the other end of the cylindrical sleeve is an indicator needle which rotates along the valve control handwheel's central axis of rotation. The indicator needle provides a visual indication on the dial face of the sub-assembly of the physical flow pattern (closed, partially opened, or fully opened) of a valve connected with and controlled by the valve control handwheel.

In operation, a valve control handwheel having the valve position indicator attached to it is rotated about its axis of rotation by a handle. As the valve control handwheel is turned either clockwise or counterclockwise, the valve control handwheel's actuator shaft rotates within a mounting bracket attached along a flange to a surface. The actuator shaft operates a coupling to open or close the valve. As the valve control handwheel is rotated, the magnets maintain the subassembly relatively stationary while the drive gear on the fixed shaft rotates the gear train and the indicator needle which is calibrated to correspond directly with the valve position. The indicator needle shows whether the valve is opened, in an intermediate position, or closed.

The valve position indicator is operable along any plane and is not limited to operating solely in a substantially vertical position.

The interior of the valve position indicator is hermetically-sealed from the external environment. The seal prevents moisture, fluid, dirt, and debris from entering the interior of the housing and impeding its operation either through direct interference with or corrosion of the interior components.

The valve position indicator provides a reliable and accurate safety feature for valve operators. This safety feature removes the guess work for determining a valve's position.

BRIEF DESCRIPTION OF THE DRAWINGS

Additional aspects, features, and advantages of the invention, as to its structure and operation, will be understood and become more readily apparent when the invention is considered in light of the following description of illustrative embodiments made in conjunction with the accompanying drawings, wherein.

DETAILED DESCRIPTION OF EMBODIMENTS OF THE INVENTION

Figure 1:
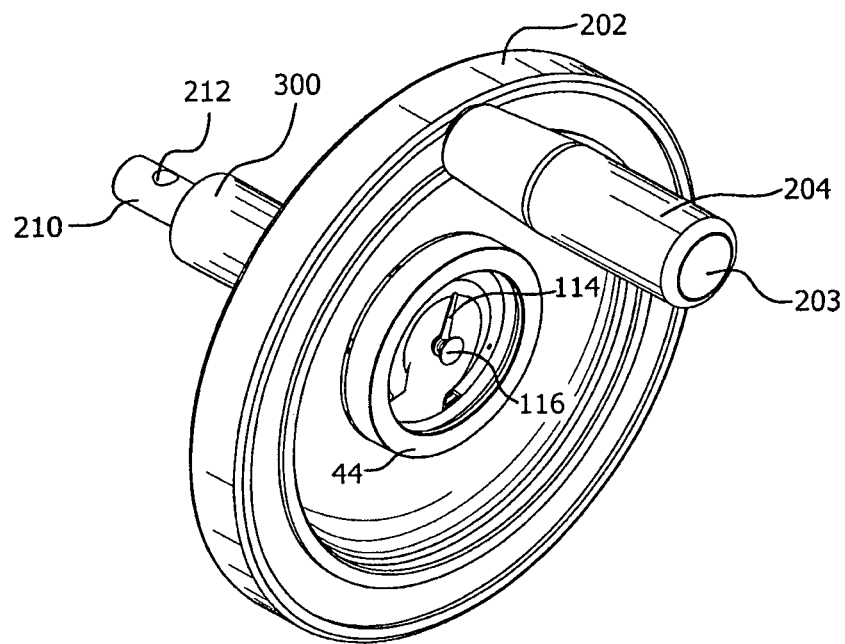
FIG. 1 is a perspective view of a valve position indicator configured with a valve control handwheel, illustrating a front, side, and top view.
Figure 2:
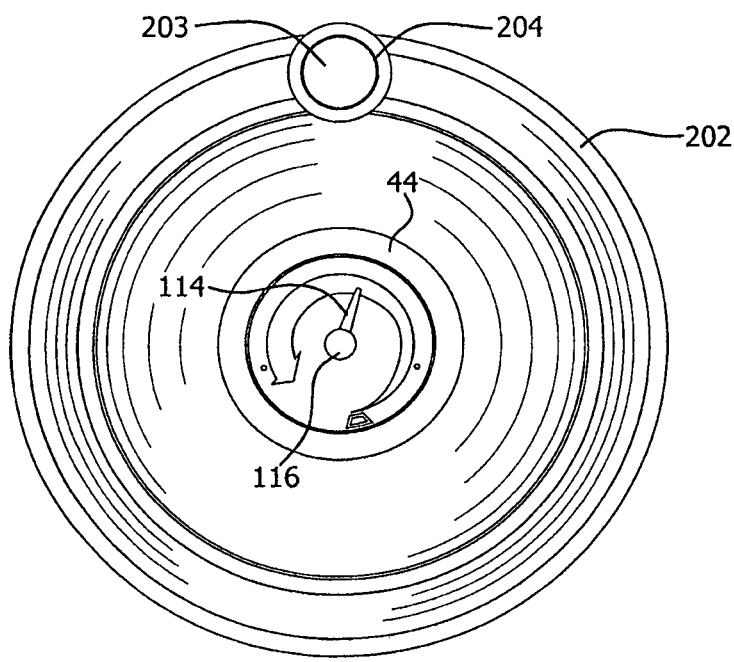
FIG. 2 is a front elevation view of the valve position indicator configured with the valve control handwheel shown in FIG. 1.
Figure 3:
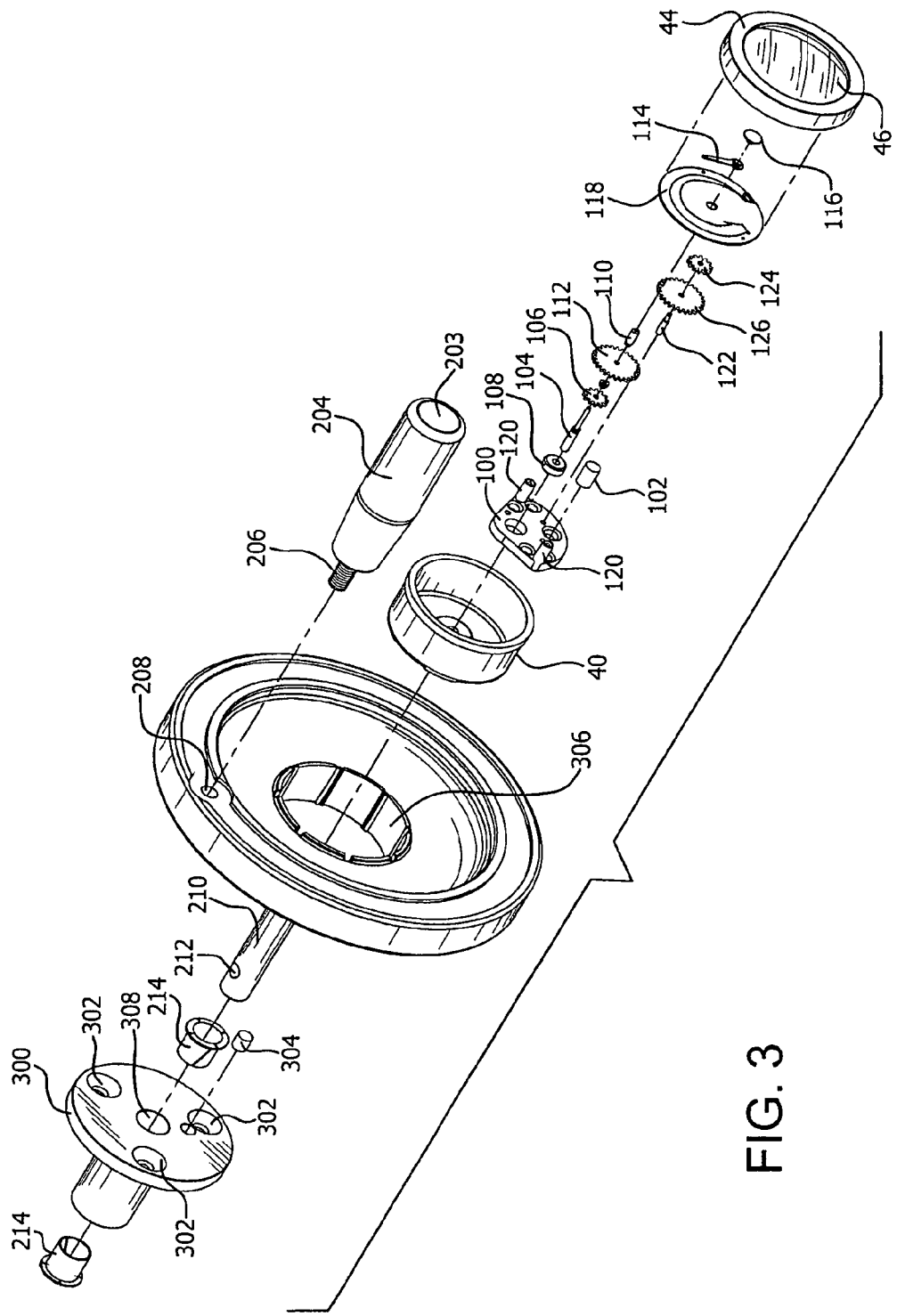
FIG. 3 is an exploded view of the valve position indicator configured with the valve control handwheel shown in FIG. 1.
Figure 4:
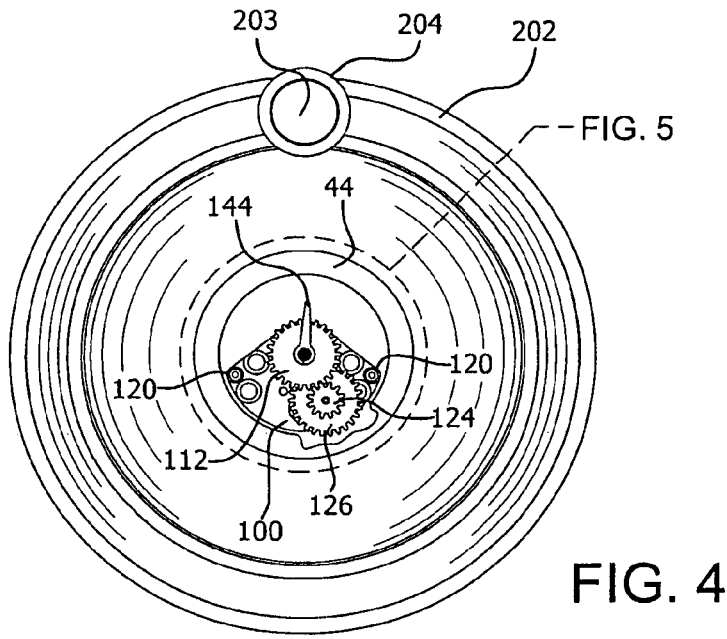
FIG. 4 is a front elevation view of the valve position indicator configured with the valve control handwheel shown in FIG. 1, illustrating a partial cutaway view of the valve position indicator.

Illustrative and alternative embodiments of the valve position indicator and methods of use thereof are described in reference to FIGS. 1-8 with variations of embodiments of the invention noted in this disclosure. Referring specifically to FIG. 3, the valve position indicator comprises housing 40 having cover 44 and window 46, all of which define an interior in which a sub-assembly with magnet 102 is provided. The valve position indicator includes another magnet 304 external to and adjacent housing 40. The interior of the valve position indicator is hermetically-sealed off from its external environment. Aspects of the sub-assembly including its dial face 118 are self-aligning with the external magnet 304 as a result of the magnetic force attracting the two magnets 102, 304 to each other. The valve position indicator is configured with valve control handwheel and calibrated to indicate with needle 114 on a dial face the position of a valve connected to and controlled by the valve control handwheel.

The valve position indicator with the valve control handwheel provides: (1) a visible, accurate, and reliable indicator for the physical flow pattern (closed, partially opened, or fully opened) of a valve operated by the valve control handwheel, (2) a safety feature, (3) universal application with valve control handwheels for rotary actuated valves, (4) a hermetically-sealed interior to protect the functional workings of valve position indicator and to prolong its operational lifetime, (5) a no contact, auto-aligning magnetic connection for maintaining dial face 118 in a stationary position relative to rotation of the valve control handwheel, and (6) limitless positions of application of the valve control handwheel including horizontal, vertical (upright or inverted), or any angle in between.

Valve position indicator can operate with valve control handwheels used to operate valves in residential, commercial, industrial, military, and other applications. For example, valve position handwheel can operate valves used with flow systems in fire and rescue vehicles and in applications with oil and gas, petrochemical, power generation, pharmaceutical and chemical, and any other operation that implements valves with flow systems. The flow systems can pipe liquids, gases, vapors, slurries, etc.

The phrase "valve control handwheel" is used in this application in reference to a rotatable device, e.g., handwheel 202, lever, or the like, having actuator shaft 210 that is positioned within a mounting mechanism, e.g., mounting bracket 300, configured to receive actuator shaft 210. In an example, handwheel 202 is a uniform structure with actuator shaft 210. Actuator shaft 210 is either directly or indirectly coupled by linkage, e.g., worm gear drive or any other torque-driven mechanism, with a valve. Rotation of handwheel 202 is used to open and close a ball, plug, butterfly, or other flow control device of the valve.

The terms "top," "bottom," "side," "front," and "back" are used in this disclosure according to their common meaning and as non-limiting descriptors relative to the valve position indicator configured with the valve control handwheel illustrated in FIGS. 1-4 and 8. These figures show the invention in a vertical configuration typically found in applications with emergency vehicles. It is intended, however, that the valve position indicator attached to handwheel 202 has no limitations with regard to the plane in which the valve position indicator may be positioned in any application, e.g., vehicle, structure, or otherwise. In other words, valve position indicator is configured to operate accurately if in a horizontal or a vertical (upright or inverted) position or any position in between.

Referring to FIGS. 1-3 and 7, the valve position indicator is shown with a valve control handwheel. The valve position indicator comprises generally housing 40 with cover 44 and window 46 as shown specifically in FIGS. 3 and 8. Housing 40, cover 44, and window 46 define an interior of the valve position indicator as shown in FIG. 8. The valve position indicator comprises a sub-assembly disposed within its interior. Referring to FIGS. 3-5 and 8, the sub-assembly comprises a gear train mounted on support member 100, rolling member 108, primary shaft 104, drive gear 106, and magnet 102 mounted on support member 100 along with dial face 118 also secured on mounting posts 120. Valve position indicator comprises further magnet 304 adjacent to housing 40 and external to the interior of valve position indicator. As shown in FIGS. 3 and 8, magnet 304 is attached to mounting bracket 300 of valve control handwheel. Housing 40, cover 44, and window 46 are hermetically sealed to protect the valve position indicator's interior enclosing the sub-assembly.

Turning now to the sub-assembly within the interior of valve position indicator, support member 100 is shown in FIG. 8 secured by rolling member 108 to rotatable primary shaft 104 that is attached to housing 40. The rotational axis of primary shaft 104 is directly aligned with handwheel's 202 axis of rotation. Drive gear 106 is attached to primary shaft 104, and both rotate with housing 40, cover 44, and window 46 when handwheel 202 is rotated clockwise or counterclockwise. In illustrative, but non-limiting embodiments, rolling member may be an open or closed bearing or similar device that permits rotation of primary shaft 104 relative to support member 100. Support member 100 comprises mounting posts 120 to which dial face 118 is attached at a distance from support member 100. Support member 100 and dial face 118 define a space in which the gear train is positioned within valve position indicator.

Referring now to FIGS. 3-6 and 8, the gear train comprises front gear 124 mounted adjacent to rear gear 126 on secondary shaft 122, along with indicator gear 112 and needle 114 attached at opposite ends of sleeve 110. Sleeve 110 is positioned around a front portion of primary shaft 104. Secondary shaft 122 is secured to support member 100 in manner that permits gears 124, 126 to rotate in unison with, not separately from, one another. For clarity, one complete rotation of front gear 124 equals one complete rotation of rear gear 126. The axis of rotation of secondary shaft 122 is provided parallel to the axis of rotation of handwheel 202.

Referring again to FIGS. 3-6 and 8, the gear train is configured so that the teeth of drive gear 106 engage the teeth of rear gear 126 and the teeth of front gear 124 engage teeth of indicator gear 112. Sleeve 110, which has indicator gear 112 attached adjacent its back end, is configured to rotate independently from primary shaft 104 along the axis of rotation of the handwheel 202. As shown specifically in FIG. 8, a portion of front end of sleeve 110 protrudes through a hole provided in the center of dial face 118. On this front end of sleeve 110, needle 114 is attached to sleeve 110, and cap 116 is provided to maintain sleeve 110 in position and prevent it from sliding off the front end of primary shaft 104. The gear train is provided to translate torque provided by rotation of handwheel, primary shaft 104, and drive gear 106 to move needle 114 relative to dial face 118. Dial face 118 provides marking indicators for opened, intermediate and closed positions correlating directly with the position of the valve controlled by handwheel 202.

Figure 5:
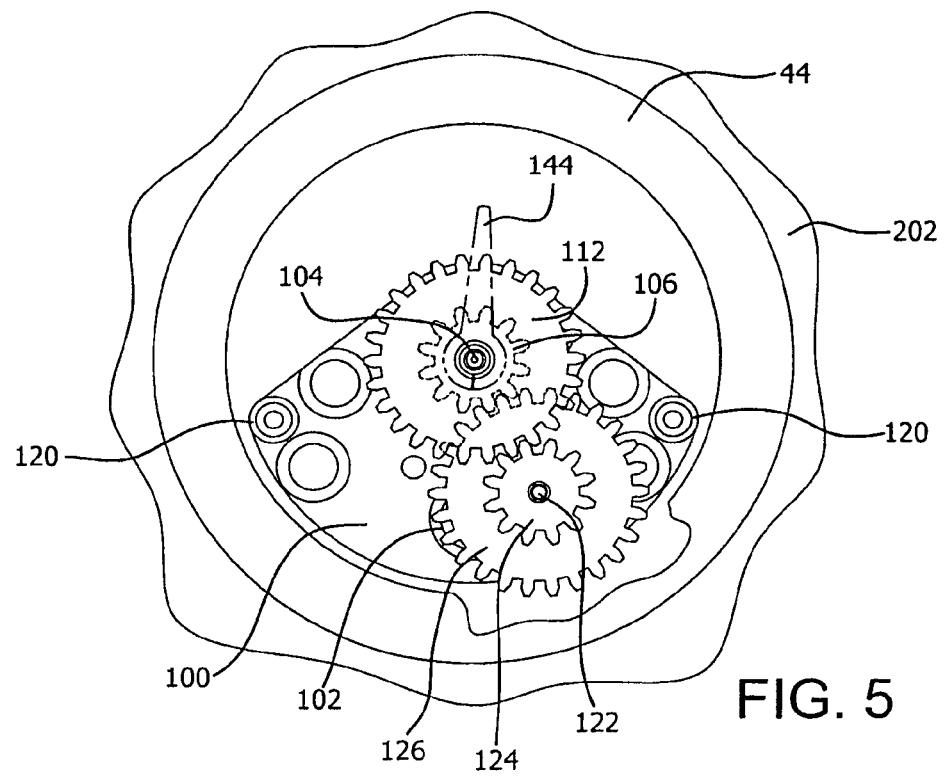
FIG. 5 is the partial cutaway view of the valve position indicator of FIG. 4.
Figure 6:
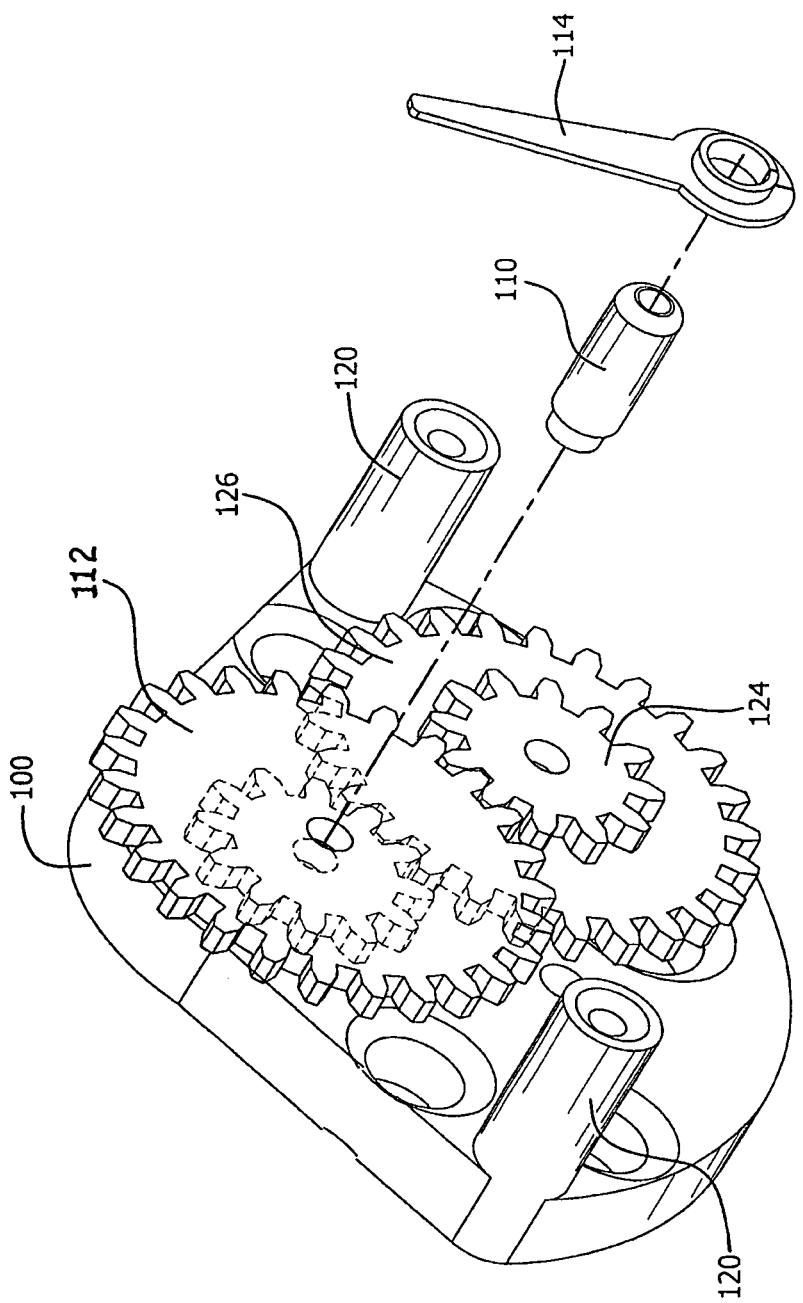
FIG. 6 is a partial exploded view of a sub-assembly of the valve position indicator, illustrating a front, side, and top view.

Referring now to FIGS. 5 and 8, valve position indicator also comprises a magnet coupling provided by magnets 102, 304. Magnet 102 is attached to support member 100, while magnet 304 is attached external to the interior of valve position indicator on mounting bracket 300 as shown, for example, in FIGS. 7 and 8. The polarities of magnets 102, 304 are aligned to attract magnets 102, 304 to one another by their magnetization. The magnetization (or strength) of magnets 102, 304 are such that, without contacting one another, they maintain support member 100 in a substantially stationary position relative to mounting bracket 300 of handwheel 202. This substantially stationary position is maintained during both clockwise and counterclockwise rotation of handwheel 202, actuator shaft 210, housing 40, cover 44, window 46, primary shaft 104, and drive gear 106 along the axis of rotation of handwheel 202 and actuator shaft 210.

The gear train is configured at any gear ratio that permits direct correlation between the position of the valve controlled by handwheel 202 and valve position indicated by needle 114 on dial face 118. As a non-limiting example, the gear ratio may be 9:1 such that handwheel 202 must be rotated 9 times to contemporaneously move needle 114 and valve from an opened position through intermediary positions to a closed position, and vice versa. It is important for this disclosure to emphasize that the gear train is not limited to any gear ratio, but rather may comprise any ratio sufficient for the size and type of handwheel valve control and valve that the handwheel is used to open and close. By way of non-limiting example, the gear ratio could range from 1:1 through to 20:1 or more.

Referring to FIGS. 1-3 and 8, handwheel 202 comprises handle 204 and actuator shaft 210. In this embodiment, handwheel 202 comprises a solid-walled, concave circular configuration having an annular rim. In other embodiments, handwheel 202 can be any geometric shape and form so long as it provides the structure to facilitate rotation of actuator shaft 210 and operation of the valve. Further alternative embodiments may comprise a spoke handwheel, a straight handwheel, an arm crank, or any other structure used to operate a rotary actuated valve. As shown in FIG. 3, handwheel 202 comprises a cup-shaped receiving space 306 in which housing 40 is substantially positioned and attached to handwheel 202. In this embodiment, space 306 is defined by a rear surface and an inner wall of cup-shaped receiving space 306. Equally spaced around this inner wall are a number of slots that extend the length of the inner wall. The slots allow moisture to drain from space 306 and rinse dirt and other debris that negatively impact operability of valve position indicator, such as, for example, that would result from accumulation of dirt or other debris, and freezing. In alternative embodiments, handwheel 202 may not have receiving space 306, but would rather provide a centrally-located mounting surface to which housing 40 would be attached to handwheel 202.

Referring now to FIG. 8, handle 204 is secured by its internal mounting post 203 through threaded bolt 206 to receiving hole 208 of handwheel 202. Internal mounting post 203 is attached to handwheel 202 but is not configured to rotate. In contrast, handle 204 is configured to freely rotate around its internal mounting post 203. Gasket 205 is provided at a location between handwheel 202 and handle 204 as a means to prevent moisture, dirt, and other debris from fouling the rotational functionality of handle 204. In alternative embodiments, handwheel 202 and its alternatives may not include handle 204.

Figure 7:
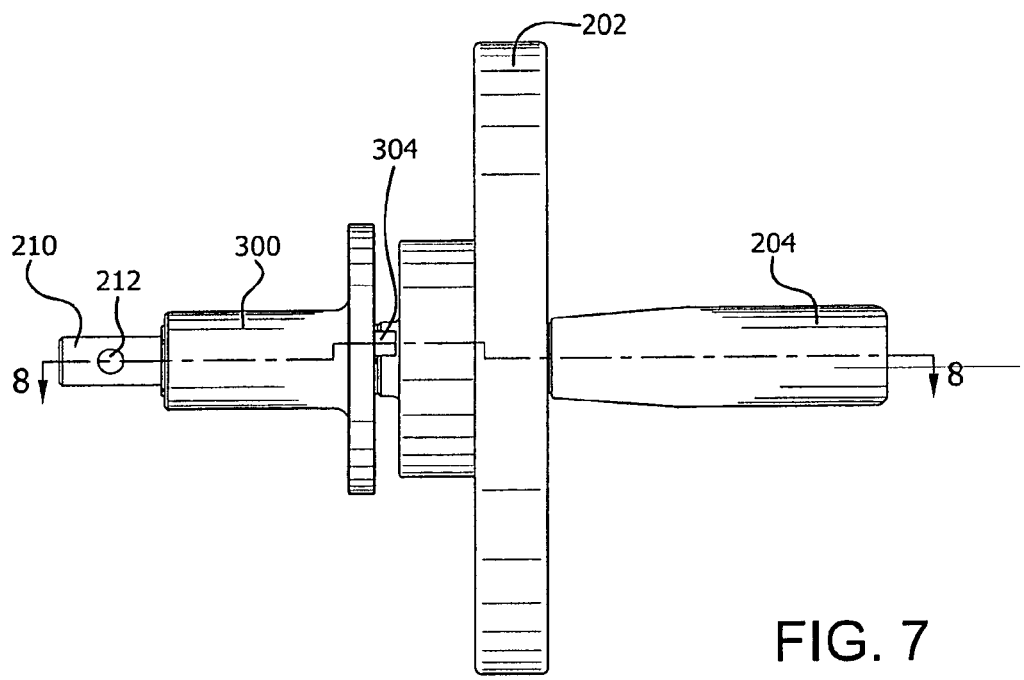
FIG. 7 is a bottom plan view of the valve position indicator configured with the valve control handwheel shown in FIG. 1.
Figure 8:
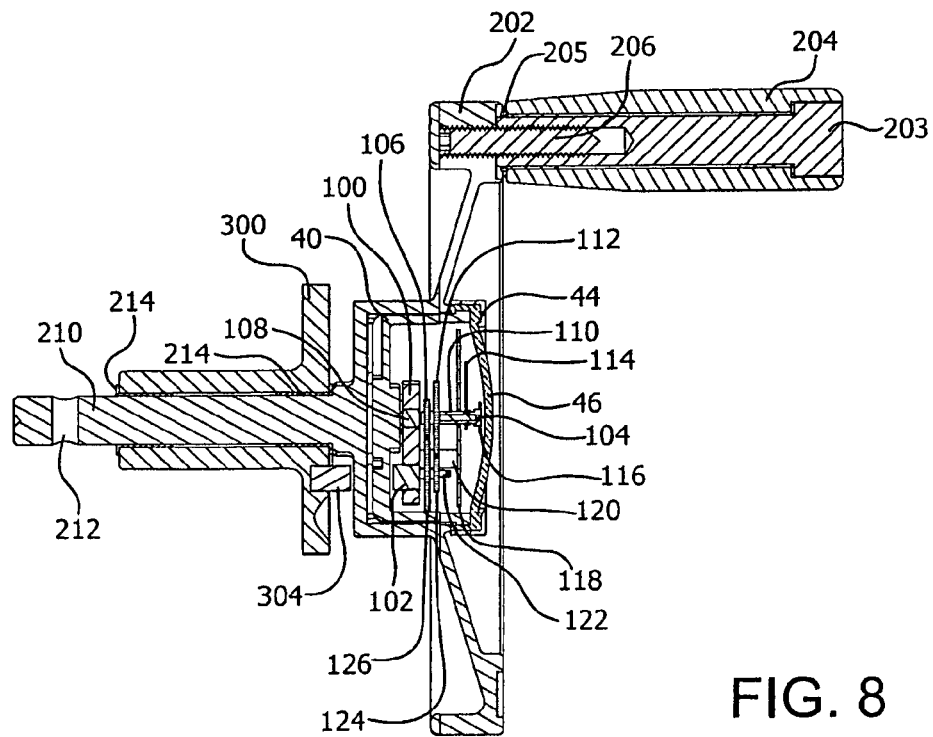
FIG. 8 is a side sectional view along line 8 illustrated in FIG. 7.

Referring now to FIGS. 1, 3, 7, and 8, handwheel 202 includes mounting bracket 300 having communication 308 to receive actuator shaft 210. Additional communications 302 with countersinks are provided through a substantially flat surface of mounting bracket 300 to allow screws, bolts, fasteners, or the like to secure bracket 300 to a surface (e.g., pump panel on a fire engine, structure, etc.). Communication 308 is a hollow cylindrical cavity positioned along the axis of rotation of handwheel 202. Communication 308 has a circular dimension that receives actuator shaft 210 and allows shaft 210 to freely and smoothly rotate within mounting bracket 300. Spacers 214 are provided to maintain actuator shaft 210 substantially centrally position within communication 308. The length of communication 308 is less than the length of actuator shaft 210. When mounted within communication 308 of mounting bracket 300, the back end of actuator shaft 210 extends beyond mounting bracket 300 in such a manner that connector 212 of shaft 210 is fully exposed for connection to linkage used to operate a valve. This permits translation of rotational movement of handwheel 202 to open and close the valve. As shown in FIGS. 7 and 8, magnet 304 is provided along a front surface of mounting bracket in such a way that a space is provided between magnet 304 and handwheel 202 to permit free rotation of handwheel 202.

The invention is also described as a method to use and operate the valve position indicator with the valve control handwheel. Valve position indicator is calibrated with valve control handwheel and valve so that an opened position indicated by needle 114 on dial face 118 corresponds with the opened valve position and a closed valve position indicated by needle 114 on dial face 118 corresponds with a closed valve position. The valve control handwheel operates the valve by moving the valve from an open position through intermediate positions to a closed position and vice versa. Throughout this operation, needle 114 indicates corresponding valve positions on dial face 118.

Methods of operation of the invention are discussed beginning with reference to a valve in a closed position and needle 114 of valve position indicator showing a closed position on dial face 118. In order to open the valve, handle 204 is used to turn handwheel 202 counterclockwise to open the valve. The number of turns necessary to open the valve from the closed position to a partially or fully opened position depends on the gear ratio of drive gear 106 and the gear train. In this non-limiting example, handwheel 202 must be rotated 9 times to fully open the valve. If the valve need only be partially opened to control fluid flow, then handwheel 202 may be rotated less than 9 times. As the handwheel 202 is rotated counterclockwise, it turns about its axis of rotation along with other rotatable elements including actuator shaft 210, housing 40, cover 44, window 46, primary shaft 104, and drive gear 106. As the rotatable elements are rotating, the polarities of magnets 102, 304 maintain support member 100 with dial face 118 attached to it, in a stationary position relative to the rotatable elements. Complementary with the magnetic force provided by magnets 102, 304, rolling member 108 permits support member 100 to remain relatively stationary as primary shaft 104 and the other rotatable elements rotate around the valve control handwheel's axis of rotation.

The counterclockwise rotation of valve actuator causes primary shaft 104 and drive gear 106 to rotate counterclockwise. This operates the gear train. Counterclockwise rotation of drive gear 106, which engages rear gear 126, rotates both rear gear 126 and front gear 124 on secondary shaft 122 clockwise. Consequently, front gear 124, which engages indicator gear 112, rotates indicator gear 112 counterclockwise. Counterclockwise rotation of indicator gear 112 rotates sleeve 110 and needle 114 counterclockwise along the valve control handwheel's axis of rotation. With each complete counterclockwise rotation of valve control handwheel, and based on the gear ratio, needle 114 moves relative to dial face 118 to indicate valve position.

Closing a valve in a partially or fully opened position follows the methods for opening the valve with handwheel 202, but in reverse. Beginning with needle 114 indicating on dial face 118 that the valve position is partially or fully opened, handle 204 is used to rotate handwheel 202, actuator shaft 210, and other rotational elements clockwise. Clockwise rotation rotates primary shaft 104 and drive gear 106 clockwise. Consequently, drive gear 106 turns rear gear 126 counterclockwise and front gear 124 rotates counterclockwise. Consequently, front gear 124 turns indicator gear 112 clockwise. As indicator gear 112 turns clockwise, it rotates sleeve 110 and needle 114 clockwise relative to dial face 118. With each complete turn of handwheel 202, needle 114 moves relative to dial face 118 indicting an opened valve position through intermediate valve positions to a closed valve position.

While the methods of operation describe the opening of a valve by counterclockwise rotation of handwheel 202 and the closing of a valve by clockwise rotation of handwheel 202, handwheel 202 with valve position indicator may be configured to close a valve by clockwise rotation of handwheel 202 and the open a valve by counterclockwise rotation of handwheel 202. This may be accomplished by reversing the printed graphics on dial face 118.

The components of the invention may be made from metals, metal alloys, plastics, polymeric compounds, rubber, fiberglass, graphite, and/or other suitable materials configured to withstand normal wear and tear and environmental exposure associated with valve actuators. As non-limiting examples, handle 204, handwheel 202, actuator shaft 210, mounting bracket 300, primary shaft 104, secondary shaft 122, the gears (drive gear 106, rear gear 126, front gear 124, indicator gear 112), rolling member 108, sleeve 110, needle 114, and cap 116 may be made from metal, metal alloys, or the like. Additionally, housing 40, cover 44, window 46, support member 100 with mounting posts 120, dial face 118, and spacers 214 may be made from plastics, polymeric materials, or the like. In other embodiments, the components of the invention may be comprised entirely of metals, metal alloys, plastics, polymeric compounds, rubber, fiberglass, graphite, and/or other suitable materials or any combination of the same.

Modifications can be made to the embodiment described above without departing from the broad inventive concept thereof. Having described embodiments of the invention, additional embodiments, adaptations, variations, modifications and equivalent arrangements will be apparent to those skilled in the art. These and other embodiments will be understood to be within the scope of the appended claims and apparent to those skilled in the art.

What is claimed is:

1. A rotation indicator assembly for a valve control handwheel comprising:
   a housing enclosing a support member in an interior space;
   a first shaft having a drive gear, the shaft positioned along a central axis of rotation of the housing and affixed to the housing;
   a rolling element attaching the support member to the shaft, the rolling element configured to allow the housing to axially rotate relative to the support member;
   a gear train engaged with the drive gear and configured to move an indicator needle adjacent a dial face in response to a change in axial position of the rotatable housing;
   a first magnet affixed to the support member; and
   a second magnet affixed to a mounting device for the valve control handwheel;
   wherein the first magnet and the second magnet are configured to maintain the support member in a substantially stationary position relative to the mounting device of the valve control handwheel.

2. The rotation indicator assembly of claim 1 wherein the interior space of the housing is hermetically sealed.

3. The rotation indicator assembly of claim 1 wherein the housing comprises a window for viewing the dial face and the indicator needle.

4. The rotation indicator assembly of claim 1 wherein the support member comprises a second shaft have two gears mounted thereon.

5. The rotation indicator assembly of claim 4 wherein a first of the two gears is in contact with and is configured to be rotated by the drive gear and wherein a second of the two gears is in contact with and is configured to rotate an indicator gear.

6. The rotation indicator assembly of claim 5 wherein the indicator gear is affixed to a first end of a cylindrical sleeve positioned around a portion of the first shaft and wherein the indicator needle is affixed to a second end of the cylindrical sleeve.

7. The rotation indicator assembly of claim 1 wherein the dial face is attached to mounting posts of the support member.

8. The rotation indicator assembly of claim 1 wherein the gear ratio is calibrated to move the indicator needle between opened to closed on the dial face in a manner that corresponds with a valve position operated by the valve control handwheel.

9. The rotation indicator assembly of claim 1 wherein polarities of the first magnet and the second magnet are aligned to attract the magnets to one another.

10. A valve control handwheel with an indicator for a position of the valve controlled by the handwheel comprising:
- a first magnet attached to a support member enclosed in a housing and a second magnet attached to a mounting bracket of the valve control handwheel;
- a rolling element rotatably securing the support member to a shaft attached to the housing and positioned along a central axis of rotation of the housing, the shaft having a drive gear;
- a gear train engaged with the drive gear and configured to rotate a sleeve positioned over the shaft along the central axis of rotation of the housing; and
- an indicator needle attached to the sleeve and adjacent a dial face secured to the support member;
- wherein polarities of the first magnet and the second magnet are aligned to attract the magnets to one another and maintain the support member in a substantially stationary position relative to clockwise and counterclockwise movement of the housing and the valve control handwheel about their central axis of rotation.

11. The valve control handwheel of claim 10 wherein an actuator shaft is rotatably secured within a communication of the mounting bracket and is configured to rotate around the central axis of rotation of the housing.

12. The valve control handwheel of claim 11 wherein the shaft of the actuator is attached with linkage components to the valve and is configured to rotate clockwise and counterclockwise to open and close the valve.

13. The valve control handwheel of claim 10 wherein the housing comprises a window for viewing the dial face and the indicator needle.

14. The valve control handwheel of claim 10 wherein the gear train comprises a gear ratio configured to move the indicator adjacent the dial face in a manner that is calibrated with the position of the valve operated by the actuator.

15. The valve actuator of claim 14 wherein the gear train comprises a secondary shaft attached to the support member and having two gears mounted thereon.

16. The valve control handwheel of claim 15 wherein a first of the two gears is in contact with and is configured to be rotated by the drive gear and a second of the two gears is in contact with and is configured to rotate the sleeve about the central axis of rotation of the housing.

17. The valve control handwheel of claim 10 wherein the housing is hermetically sealed.

18. A safety device comprising:
- a valve control handwheel comprising a handwheel, an actuator shaft positioned in and through a communication of a stationary mounting bracket and configured to be engaged by linkage components to a valve, and a first magnet affixed to the mounting bracket; and
- a valve position indicator comprising a housing enclosing a support member and secured to the handwheel, a shaft secured to the housing and positioned along a central axis of rotation of the handwheel, a drive gear attached to the shaft, a rolling element attaching the support member to the shaft, a gear train configured to be responsive to a change in axial position of the drive gear and to rotate a sleeve with an indicator needle relative to a dial face mounted on the support member, and a second magnet attached to the support member; and
- wherein polarities of the first magnet and the second magnet are configured to attract the magnets to one another and maintain the support member in a substantially stationary position relative to axial movement of the housing around the central axis of rotation of the valve control handwheel.

19. The safety device of claim 18 wherein the gear train comprises a gear ratio calibrated to move the indicator needle from opened to closed indications on the dial face in a manner that corresponds with a position of a valve to be operated by the valve control handwheel.

20. The safety device of claim 18 wherein the housing is hermetically sealed.

* * * * *